United States Patent

Lee

Patent Number: 5,960,353
Date of Patent: Sep. 28, 1999

[54] MICROCELL LOAD MEASUREMENT USING FEEDBACK CONTROL

[75] Inventor: David Y. Lee, Randolph, N.J.

[73] Assignee: Lucent Technologies, Inc., Murray Hill, N.J.

[21] Appl. No.: 08/777,987

[22] Filed: Dec. 24, 1996

[51] Int. Cl.⁶ ..................................................... H04Q 7/00
[52] U.S. Cl. .......................... 455/453; 455/444; 455/67.1; 455/509; 455/450
[58] Field of Search ..................................... 455/422, 453, 455/450, 455, 443, 444, 449, 509, 516, 517, 522, 524, 561, 562, 67.1

[56] References Cited

U.S. PATENT DOCUMENTS

| | | |
|---|---|---|
| 3,943,447 | 3/1976 | Shomo, III . |
| 4,454,538 | 6/1984 | Toriumi . |
| 4,805,014 | 2/1989 | Sahara et al. . |
| 5,029,333 | 7/1991 | Graves et al. . |
| 5,142,532 | 8/1992 | Adams . |
| 5,276,907 | 1/1994 | Meidan ................................... 455/522 |
| 5,299,228 | 3/1994 | Hall . |
| 5,414,773 | 5/1995 | Handelman . |
| 5,442,662 | 8/1995 | Fukasawa et al. . |
| 5,454,026 | 9/1995 | Tanaka ................................... 455/453 |
| 5,463,310 | 10/1995 | Pegg et al. . |
| 5,488,413 | 1/1996 | Elder et al. . |
| 5,579,374 | 11/1996 | Doi et al. ................................ 455/444 |
| 5,794,153 | 8/1998 | Ariyavisitakul et al. .............. 455/67.1 |

*Primary Examiner*—Doris H. To
*Attorney, Agent, or Firm*—Synnestvedt & Lechner

[57] ABSTRACT

A method and system are disclosed for determining load on a microcell in a telecommunications network. The network comprises a base station, at least one microcell controlled by the base station, at least one terminal served by the microcell, and feedback between the base station and the terminal. The feedback enables the terminal to provide an up-link signal indicative of a particular down-link signal from the microcell. The method embodiment of the invention involves transmitting a particular down-link signal from the microcell, and receiving an up-link signal from a terminal. Next, a determination is made whether the up-link signal is indicative of the particular down-link signal. If it is, then the load on the microcell includes the terminal. The method and system are particularly useful in CATV networks having a plurality of microcells operating in a simulcast mode. In one preferred embodiment, the microcell transmits the particular down-link signal in a certain pattern, if the up-link signals of the terminal reflect the pattern of the particular down-link signal, then its load on the microcell is confirmed. Once the load of a microcell is determined, then the network may be optimized for capacity and quality. In one embodiment, optimization is performed by altering the RF carrier among the microcells to balance load in the network.

20 Claims, 4 Drawing Sheets

MICROCELL LOAD MEASUREMENT USING FEEDBACK CONTROL

BACKGROUND OF THE INVENTION

1. Field of Invention

The present invention generally relates to determining load within a wireless telecommunication network. More specifically, the present invention discloses a system and method for dynamically determining subscriber load on a microcell within a cell using a control or feedback loop.

2. Background

As the number of people using cellular networks increases, so does the need to optimize these networks to increase capacity and quality. One important factor in optimizing these networks is determining and controlling the subscriber load within the network. Systems and techniques for determining load at the cell level are known in the art, however, when the cell is divided into simulcasting "microcells," the determination of load on each microcell becomes much more difficult. This difficulty arises because the signals from all the simulcasting microcells of a cell are combined at the cell's base station rendering traditional load measurements techniques, such as received signal strength (RSSI), ineffective. One alternative involves adding dedicated circuitry and communication channels to each microcell to determine subscriber load. Such an approach, however, increases the system's cost and complexity, which should be avoided. Therefore, a need exists for determining microcell load without the cost and complexity of additional circuitry. The present invention fulfills this need among others.

SUMMARY OF THE PRESENT INVENTION

The present invention relates to a method and system for determining load on a microcell in a telecommunications network. In one embodiment, the network comprises a base station, at least one microcell controlled by the base station, at least one terminal served by the microcell, and feedback between the base station and the terminal. The feedback enables the terminal to provide a response indicative of a particular down-link signal from the microcell.

The method embodiment of the invention involves transmitting a particular downlink signal from a microcell of the network. Next, a determination is made that the load of the microcell includes a certain terminal if that terminal provides a response indicative of the particular down-link signal. The method and system are particularly useful in CATV networks having a plurality of microcells operating in a simulcast mode. In one preferred embodiment, the microcell transmits the particular down-link signal in a certain pattern, if the responses of the terminal reflect the pattern of the particular down-link signal, then its load on the microcell is confirmed.

Once the load of a microcell is determined, then the network may be optimized for capacity and quality. In one embodiment, optimization is performed by altering the RF carrier among the microcells to balance load in the network.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings, wherein like reference numerals identify like elements, and wherein:

DETAILED DESCRIPTION OF THE PRESENT INVENTION

The present invention relates to a method and system for dynamically determining the subscriber load on a microcell in a wireless system. The invention may be practiced in any wireless system recognizing feedback from a subscriber's terminal.

Figure 1:
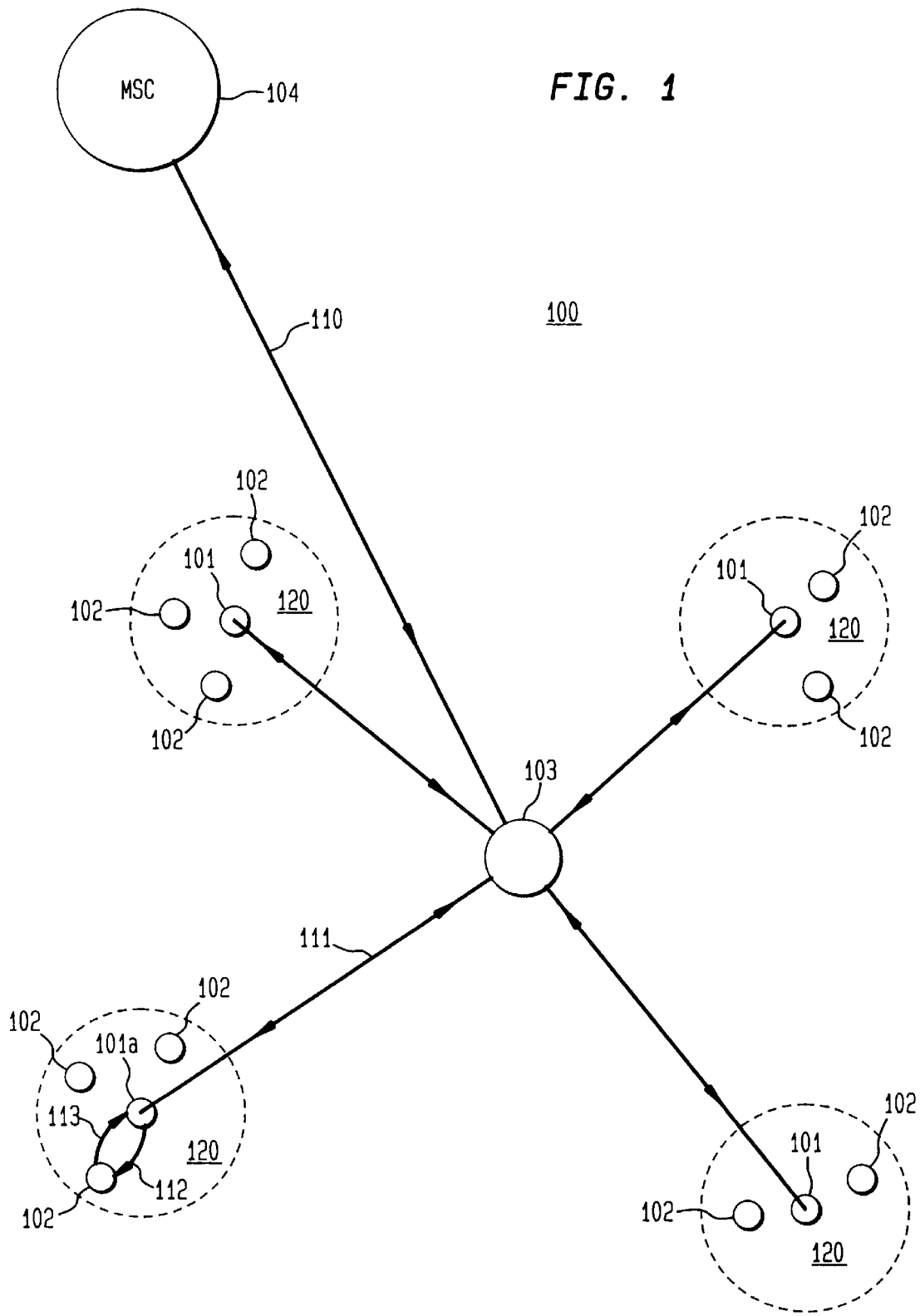
FIG. 1 shows a basic schematic diagram of a cellular system having microcells.

A suitable system 100 is depicted in FIG. 1. In that figure, a mobil switching center (MSC) 104 controls a base station 103 over a communicative link 110 that may be a landwire or wireless link. The base station 103, in turn, employs a plurality of microcells 101 to broadcast and receive signals at the same frequency over an area 120. As used herein, the term "mircocell" broadly refers to a subdivision of a cell served by a base station. Communication between the base station and a microcell occurs over a link 111, which may be fiber optic, metallic, coaxial, wireless channels, or other suitable means depending upon the application. The microcells of a cell typically simulcast at the same frequency thereby effectively expanding the area that a given base station may serve. Examples of microcells include repeaters, reradiators, and CATV remote antenna drivers (RADs) (described in detail below).

A particular microcell 101a serves a set of subscriber terminals 102. The term "terminal" as used herein broadly refers to any wireless device used by a user to receive and transmit signals in a wireless system. The terminal should be capable of transmitting a signal responsive to the signal it receives. Suitable terminals are well known in the art and include cellular handsets and wireless modems.

Wireless communication occurs between the subscriber terminals 102 and the microcell 101. Down-link (or forward) signals 112 propagate from the MSC 104 to the subscriber terminal 102, and up-link (or reverse) signals 113 propagate from the subscriber terminal 102 to the MSC 104.

The system also includes a feedback means (not shown) which enables the terminal 102 to provide an up-link response indicative of a particular down-link signal. As used herein, the term "feedback" broadly refers to an indication of a signal between the microcell and a particular subscriber's terminal. For example, feedback may comprise a response from a terminal indicating the power level, frequency, quality, or mere existence of a signal transmitted from a microcell. The type of indication is irrelevant providing that there is a one to one correspondence between the indication and the subscriber. In other words, the indication must be attributable to a single terminal.

Figure 2:
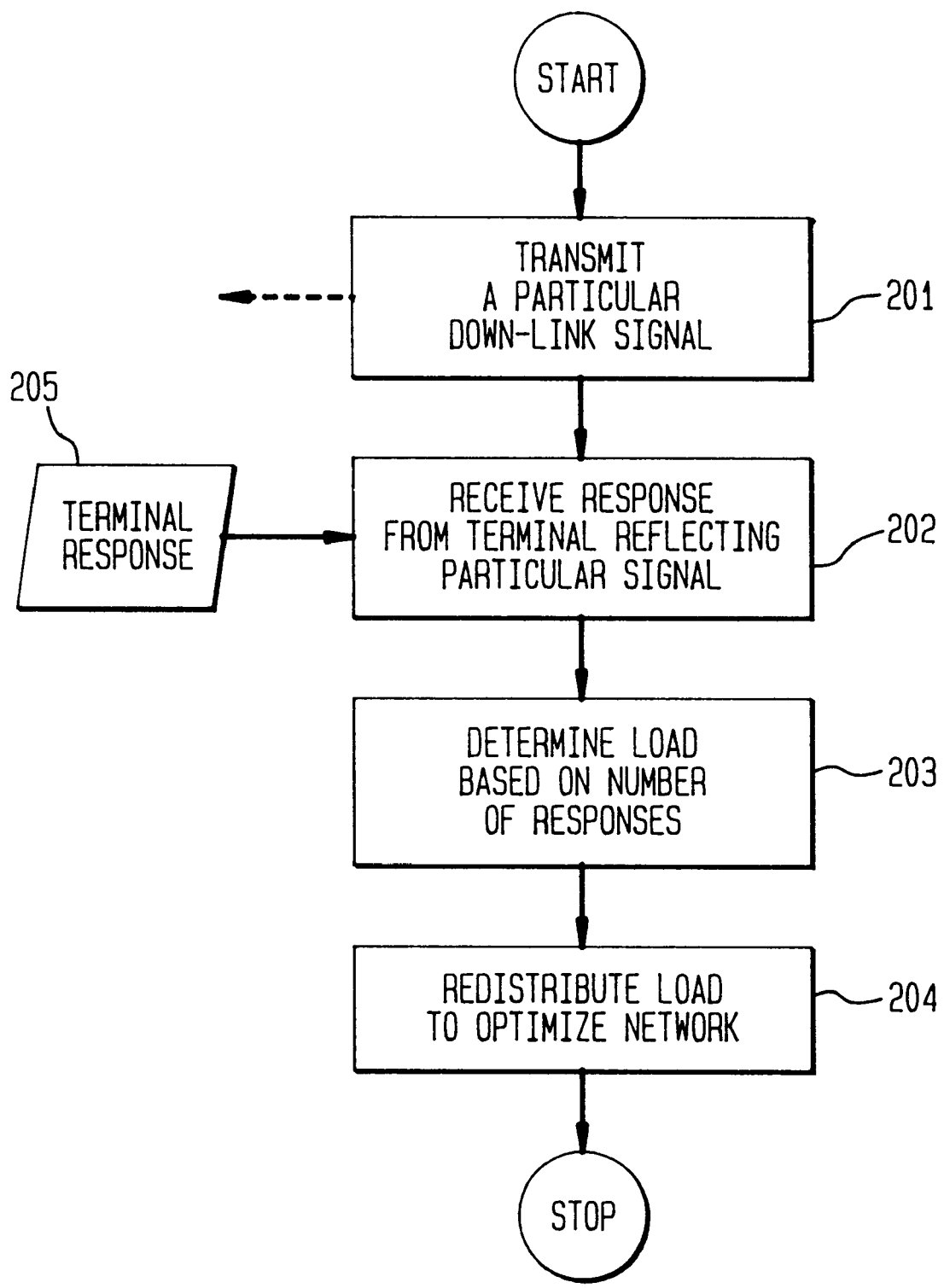
FIG. 2 shows a basic flow diagram of the process.

A simple method embodiment of the invention is depicted in FIG. 2. In Block 201, a microcell transmits a particular down-link signal to at least one terminal 205. Upon receiving the particular down-link signal, terminal 205 provides an up-link response indicative of the particular down-link signal. Block 202 receives and records the up-link response. In Block 203, the subscriber load on the microcell is determined by tabulating the number of up-link responses that reflect the particular down-link signal.

Calculating the load on a microcell load using this method provides important process information to the system which can be used to optimize the system's performance. For example, in the embodiment shown in FIG. 2, the load information is used to optimize the system's capacity by adjusting microcell's carrier frequency to balance load between cells. Load information may also be used for purposes of trouble shooting, interference evaluation, accounting, resource allocation and design/development purposes, and any other purpose requiring an indication of load.

The present invention is well suited for application in the field of cellular telecommunications, particularly CATV wireless phone communications. This application is discussed below in regard to preferred and alternate embodiments. It should be understood that these embodiments are for illustrative purposes only and should not be used to limit the scope of the claims.

Figure 3:
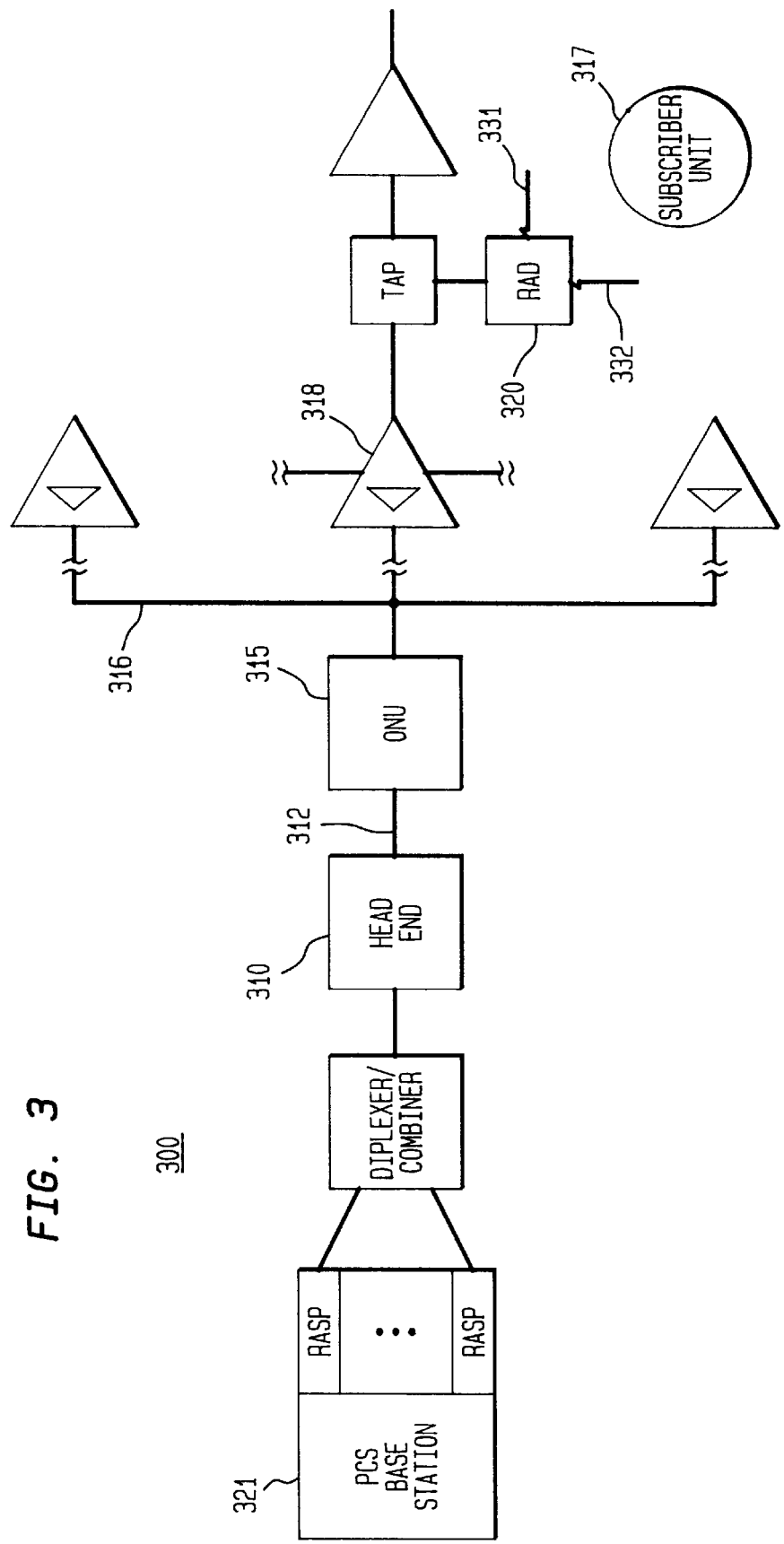
FIG. 3 shows a schematic diagram of a CATV system having microcells.

A simplified overview of a typical CATV network is depicted in FIG. 3. This is commonly referred to as a tree and branch structure. Parts of this system common to most CATV networks include a head-end 310, where programming signals originate. The head end 310 is connected by fiber optics 312 to a number of optical network units ONU 315. At the ONU 315, the optical signal is converted to an electrical signal and sent down the distribution network using conventional coaxial cables 316. This cable is split into different paths for distribution to multiple routes with multiple subscriber units 317. If their branches become long enough, line amplifiers (also known as extenders) 318 are inserted at intervals in the coaxial cable network to boost the signal. If telephone service is desired, the CATV architecture provides a return path. A detailed description of the structure and operation of the CATV network of these conventional components will not be presented herein since the technology is well known in the art. For example, U.S. Pat. No. 5,488,413 provides an overview of known CATV telephony systems and components and is incorporated by reference herein.

The system of the present invention includes a multitude of microcells 320 proximate to the subscriber set 317 and a PCS base station 321 associated with the head-end 310. As applied to CATV networks, microcells are RF frequency translators to convert the communication channels from cable channels to wireless channels. The microcell includes a remote antenna driver (RAD), which performs the frequency translation, and may also contain transmitting and receiving antennas 331, 332 and other hardware known in the art to facilitate wireless communication with the subscriber set 317. A microcell typically is mounted atop telephone polls in a CATV network, which limits its effective range. Consequently, a multitude of simulcasting microcells are usually employed to expand the cell one base station can serve.

To accommodate the RAD, the PCS base station in the present invention contains a remote antenna signal processor (RASP). The RASP provides essentially two functions. First, it converts down-link signals from a base station radio frequency to a cable TV channel frequency, and conversely, converts up-link signals from a cable TV channel frequency to a base station radio frequency. Second, the RASP provides the RAD functions to address and control each microcell individually. These functions include RF carrier on/off, changing RF carrier, and increasing/decreasing transmit power. The physical embodiment of the RASP can vary. If the system of the present invention is to be retrofitted to an existing PCS base station, it may be preferred to have a discrete RASP that can operatively connected to the base station. On the other hand for new base stations, it may be preferred to integrate the RASP with the base station to reduce complexity at the head end.

An important aspect of the CATV system's operation is the control between the base station, microcell, and terminals. Control is achieved using separate control channels that are interlaced between wireless channels embedded with CATV channels. The control channels include CDMA and RAD control channels which provide the communicative link for the RASP to address and control each RAD as discussed above. The control channels also provide for signal control to handle supervision and signaling information. Such signal control is known in the art and suitable systems include Advanced Mobile Phone System (AMPS), General System for Mobils (GSM), Digital Mobil Radio (DMR), Time Diversity Multiple Access (TDMA) and Code Division Multiple Access (CDMA).

For illustration purposes, the discussion herein focuses on CDMA technology. It should be understood, however, that other technologies may be used providing that they enable the terminal to respond with an up-link signal that is responsive to a down-link signal. CDMA is a spread spectrum technology where multiple narrow band information channels are transmitted over a common wide band carrier by coding with uncorrelated code sequences for each information channel. For reception, the wideband signal is separated out to individual narrow band signals by correlating the wideband signal with the same code sequences. CDMA technology is well known in the art and is described in CDMA Network Engineering Handbook, Volume 1: Concepts in CDMA, Nov. 23, 1992, which is incorporated herein by reference.

Among its other features, CDMA provides feedback control between the base station and the subscriber base in the form of power control. The CDMA terminal telephone system employs down-link and up-link power control to achieve high capacity, quality, and other benefits. This power control feedback can also be exploited by the system and method of the present invention. Before discussing its application to the present invention, a more detailed description of the control protocol is provided below.

It is desirable to maximize the capacity of the CDMA system in terms of the number of simultaneous telephone calls that can be handled in a given system bandwidth. The system capacity is maximized if the transmit power of each subscriber terminal is controlled so that its signal arrives at the base station with the minimum required signal-to-interference ratio (Eb/No). Eb/No is the ratio of energy per bit to the noise power spectral density and is the standard figure of measurement by which digital modulation and coding schemes are compared. If a subscriber terminal's signal arrives at the base station with a lower level of received power, then the terminal's performance is degraded. If the received power is too high, the performance of this subscriber terminal is improved, but interference to all the other subscriber terminal transmitters that are sharing the channel is increased, and may result in unacceptable performance to other users unless the capacity is reduced. The objective of the subscriber terminal transmitter power control process is to produce a nominal received signal power from each subscriber terminal transmitter operating within the cell at the base station receiver. Theoretically, regardless of a subscriber terminal's position or propagation loss, each subscriber terminal's signal should be received at the base station at the same level.

A typical CDMA system employs an up-link open loop power control, up-link closed loop power control, and down-link power control. Up-link or up link open loop power control is primarily a function of the subscriber terminals. The subscriber terminal rapidly adjusts transmit power according to commands from the base station. In open loop power control, the subscriber terminal measures the received power level from the base station and adjusts its transmit power in an indirectly proportional manner. Open loop power control is a coarse power control that provides a window for close loop power control to operate. The base station supports the power control functions by providing a calibration constant to the served subscriber terminals. The calibration constant is sensitive to the cell load, cell noise figure, antenna gain, and power amplifier output. This constant is sent as part of a broadcast message from the cell to the terminal.

In the up-link closed loop power control, the base station takes an active role. The goal of the closed loop portion is for the cell to provide rapid corrections to the subscriber terminal's open loop estimate to maintain the optimum transmit power. The cell measures the relative received power level of each terminal's signal, and compares the signal to an adjustable threshold. The threshold is provided to the base station by the system controller residing at the MSC. Typically, the threshold, the frame erasure rate (FER) is used throughout the cell. It may be preferred, however, to apply an individual FER subscriber to provide different grades of service and also to allow for greater tolerance in shadowed areas. This level is passed to the channel controller, where a determination is made periodically (e.g., every 1.25 ms) based upon the signal-to-interference ratio for each mobil station to either transmit a power-up command or a power-down command to that particular subscriber terminal. This closed loop correction compensates for rapid signal strength variation due to Rayleigh fading and inaccuracies in open loop power control due to unequal propagation losses between the down and up-links. This mechanism is called the up-link closed loop power control.

The cellular system may also support down-link closed loop power control by adjusting the down link power for each subscriber link signal in response to measurements provided by the subscriber terminal. The purpose is to reduce power for units that are either stationary, relatively close to the base station, impacted little by multipath fading and shadowing effects, or experiencing minimal other cell interference. Thus, extra power can be given to units that are either in a more difficult environment or far away from the cell and experiencing high error rates.

In one embodiment, the down-link power control is performed by periodically reducing the power at which the base station transmits to the subscriber. This process continues until the subscriber, sensing an increase in received BER, requests additional power. The base station receives the power adjustment requests from each subscriber terminal and responds by adjusting the power by a predetermined amount.

Figure 4:
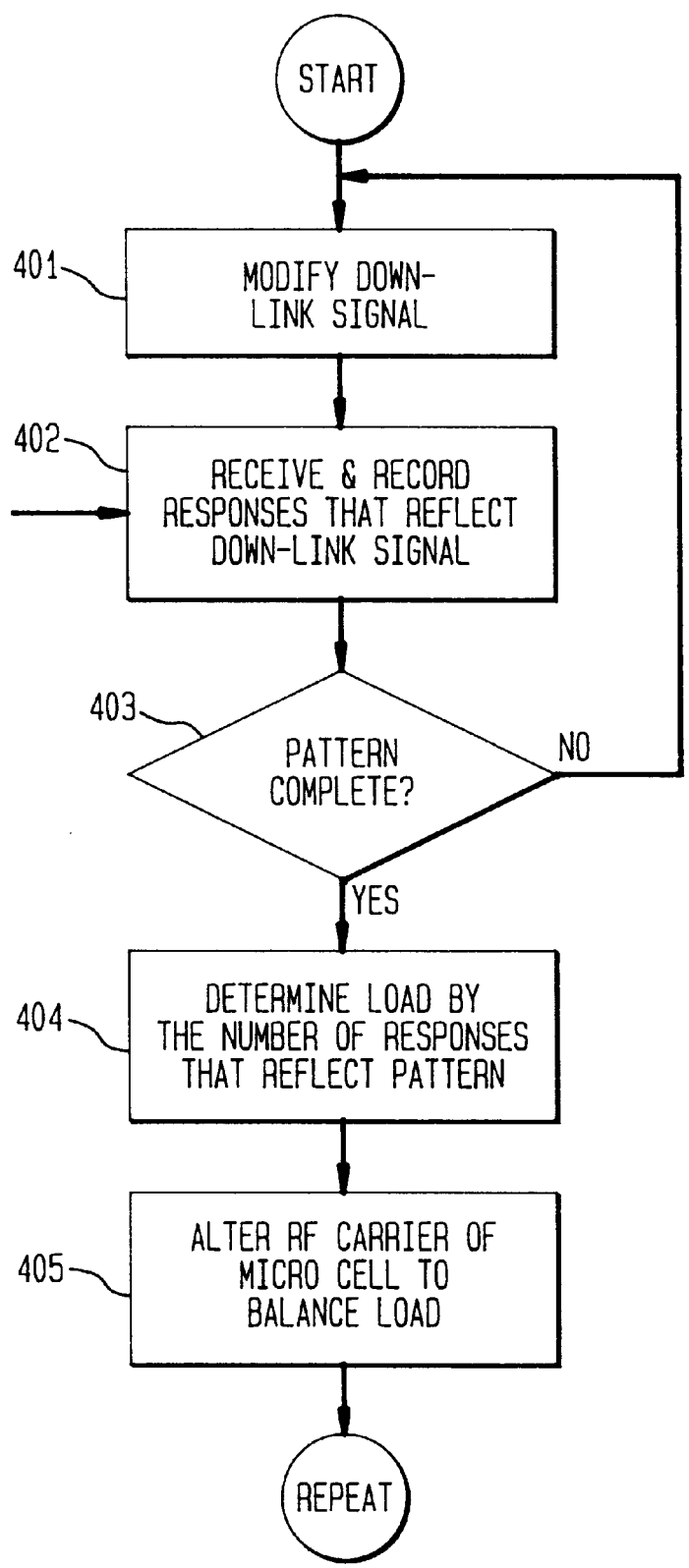
FIG. 4 shows a preferred embodiment of the process.

The present invention exploits a system's feedback control to determine load on the microcell. A preferred embodiment of the invention is depicted in FIG. 4. In Block 401, a modified down-link signal is transmitted to a subscriber base using transmitting means. Such means typically involves the cooperation of the microcell and the base station at the head end. The signal transmitted from the microcell is modified preferably by varying its strength according to commands from the base station via a RAD/RASP control channel. Since the down-link signal is generally held constant or at an optimum value by the CDMA power control loop, a change in signal strength sufficient to increase or decrease the received bit error rate (BER) at a terminal to a certain level will prompt a reaction from that terminal.

It should be understood, that although the down-link signal power is altered, the communication link between said microcell and the terminal is maintained. That is, the up-link closed loop power control described above will request the terminals to adjust power to maintain the desired BER. This approach also requires that the terminals have reserve power to compensate for a weak signal; i.e., the terminals cannot already be at maximum power.

In Block 402, responses to the modified down-link signal are received and recorded by the receiving means. Such means typically involve conventional communication links between the microcell and the base station, as well as a conventional computer having data storage means. A terminal served by the microcell will respond to the modified signal by indicating a reflective change in its BER. In systems having down-link closed loop power control, the terminal may also request an increase in power upon sensing an decrease in FER. Therefore, in this particular embodiment, the terminal's indicative response by be the BER or a request for a change in down-link power. The number of responses reflecting the modified down-link signal are recorded in Block 402.

The preferred embodiment of the invention involves transmitting a pattern of particular down-link signals and observing the terminal responses that reflect the pattern. Using a series or pattern of particular down-link signals rather than a single signal distinguishes terminals that are actually receiving the signals from those which coincidentally happen to be transmitting a power up or down request to the base station from another microcell location. In other words, a base station may receive a power up or down signal from a terminal operating on another microcell which is unrelated to the particular down-link signal. It is highly unlikely, however, that a terminal operating from another microcell will transmit responses that reflect a pattern of particular down-link signals from a different microcell.

Referring back to FIG. 4, Block 403 determines whether the pattern of down link signals has been completed. If not, the process returns to Block 401 where the down-link signal is again modified. This may entail returning it to an optimum power level if the previous signal was non-optimum or it may entail further deviating the signal from optimum power. The important aspect though is that the signal be modified to prompt a response from any terminal it serves.

Once the pattern of down-link signals has been transmitted, Block 404 determines the subscriber load on the microcell using determination means which may be any conventional computer operatively connected to the base station. As mentioned above, this is performed by tabulating the number of terminal responses that reflect the pattern of down-link signals. This number is the load on the microcell.

Knowing the load on the microcell has several important uses. Among these uses is optimizing capacity and quality by redistributing load. For example, if the load on a microcell indicates that a particular RF carrier is overloaded resulting in interference and inaccessibility, then the base station, via a RASP/RAD control channel, can assign the microcell to a different simulcast group having less traffic. Controlling the traffic on a cellular network can be accomplished dynamically using this method. The base station can be configured to continuously poll the various microcells and change frequencies as required. In this way, the network can be continuously optimized.

Numerous modifications and variations of the present invention are possible and would be obvious in the light of the above teachings. It is therefore understood that within the scope of the appended claims, the invention may be practiced otherwise than as specifically described herein.

What is claimed is:

1. A method for determining load on a microcell in a telecommunications network, said network comprising a base station, a plurality of simulcasting microcells controlled by said base station, at least one terminal served by said base station, and feedback between said base station and said terminal, said feedback enabling said terminal to provide an up-link signal indicative of a particular down-link signal from said microcell, said method comprising:
   transmitting a particular down-link signal from a particular microcell;
   receiving an up-link signal from a terminal; and
   determining that the load of said particular microcell includes said terminal if said up-link signal is indicative of said particular downlink signal.

2. The method of claim 1, wherein said up-link signal includes bit error rate.

3. The method of claim 2, wherein said feedback is CDMA power control.

4. The method of claim 2, wherein said microcell transmits said particular down-link signal in a certain pattern, said load of said microcell including said terminal if up-link signals from said terminal reflect said pattern of said particular down-link signal.

5. The method of claim 2, further comprising
   adjusting the operating frequency of said microcell according to said subscriber load on said microcell.

6. The method of claim 5, wherein said telecommunications system is CATV system, and wherein said system comprises a plurality of microcell groups, each group operating in a particular simulcast mode; said method further comprising:
   assigning a microcell to one of said groups according to its subscriber load to optimize total subscriber load on each group.

7. A system for determining load on a microcell in a telecommunications network, said network comprising a base station, a plurality of simulcasting microcells controlled by said base station, at least one terminal served by said base station, and feedback between said base station and said terminal, said feedback enabling said terminal to provide an up-link signal indicative of a particular down-link signal from said microcell, said method comprising:
   means for transmitting a particular down-link signal from a particular microcell;
   means for receiving an up-link signal from a terminal; and
   means for determining that the load of said particular microcell includes said terminal if said up-link signal is indicative of said particular down-link signal.

8. The system of claim 7, wherein said up-link signal includes bit error rate.

9. The system of claim 8, wherein said feedback is CDMA power control.

10. The system of claim 8, wherein said means for transmitting transmits said particular down-link signal in a certain pattern, said load of said microcell including said terminal if up-link signals from said terminal reflect said pattern of said particular downlink signal.

11. The system of claim 8, further comprising
   means for adjusting the operating frequency of said microcell according to said subscriber load on said microcell.

12. The system of claim 11, wherein said telecommunications system is CATV network, and wherein said network comprises a plurality of microcell groups, each group operating in a particular simulcast mode; said system further comprising:
   means for assigning a microcell to one of said groups according to its subscriber load.

13. A method for determining load on a microcell in a telecommunications network, said network comprising a base station, at least one microcell controlled by said base station, at least one terminal served by said base station, and feedback between said base station and said terminal, said feedback enabling said terminal to provide an up-link signal indicative of a particular down-link signal from said microcell, said method comprising:
   transmitting a particular down-link signal from said microcell;
   receiving an up-link signal from a terminal, wherein said up-link signal includes a request for a change in down-link signal power; and
   determining that the load of said microcell includes said terminal if said up-link signal is indicative of said particular down-link signal.

14. The method of claim 13, wherein said feedback is CDMA power control, and wherein said particular down-link signal is a non-optimum strength signal, and wherein said up-link signal is a request that down-link signal strength be adjusted.

15. A method for determining load on a particular microcell in a telecommunications network, said network comprising a plurality of simulcasting microcells, a base station that controls said plurality of simulcasting microcells, at least one terminal served by said base station, and feedback between said base station and said terminal, said feedback enabling said terminal to provide an up-link signal indicative of a particular downlink signal from said microcell, said method comprising:
   transmitting a particular down-link signal from a particular microcell of said plurality of microcells;
   receiving an up-link signal from a terminal;
   determining that the load of said particular microcell includes said terminal if said up-link signal is indicative of said particular down-link signal; and
   adjusting the microcells simulcasting to optimize load.

16. The method of claim 15, wherein said system comprises a CATV phone system.

17. A system for determining load on a microcell in a telecommunications network, said network comprising a base station, at least one microcell controlled by said base station, at least one terminal served by said base station, and feedback between said base station and said terminal, said feedback enabling said terminal to provide an up-link signal indicative of a particular down-link signal from said microcell, said system comprising:
   means for transmitting a particular down-link signal from said microcell;
   means for receiving an up-link signal from a terminal, wherein said up-link signal includes a request for a change in down-link signal power; and
   means for determining that the load of said microcell includes said terminal if said up-link signal is indicative of said particular down-link signal.

18. The system of claim 17, wherein said feedback is CDMA power control, and wherein said particular down-link signal is a non-optimum strength signal, and wherein said up-link signal is a request that down-link signal strength be adjusted.

19. A system for determining load on a particular microcell in a telecommunications network, said network comprising a plurality of microcell groups, each microcell group simulcasting at a certain RF, a base station that controls said plurality of microcells, at least one terminal served by said base station, and feedback between said base station and said terminal, said feedback enabling said terminal to provide an up-link signal indicative of a particular down-link signal from said microcell, said system comprising:

means for transmitting a particular down-link signal from a particular microcell of said plurality of microcells;

means for receiving an up-link signal from a terminal;

means for determining that the load of said particular microcell includes said terminal if said up-link signal is indicative of said particular downlink signal; and means for adjusting the RF of said particular microcell according to its load.

20. The system of claim 19, wherein said network comprises a CATV phone system.

\* \* \* \* \*